Aug. 8, 1967

P. C. SMITH ETAL 3,334,909

CONVERTIBLE STROLLER APPARATUS

Filed Jan. 6, 1967

PAUL C. SMITH
RICHARD E. HYDE
INVENTORS.

BY Lyon&Lyon
ATTORNEYS

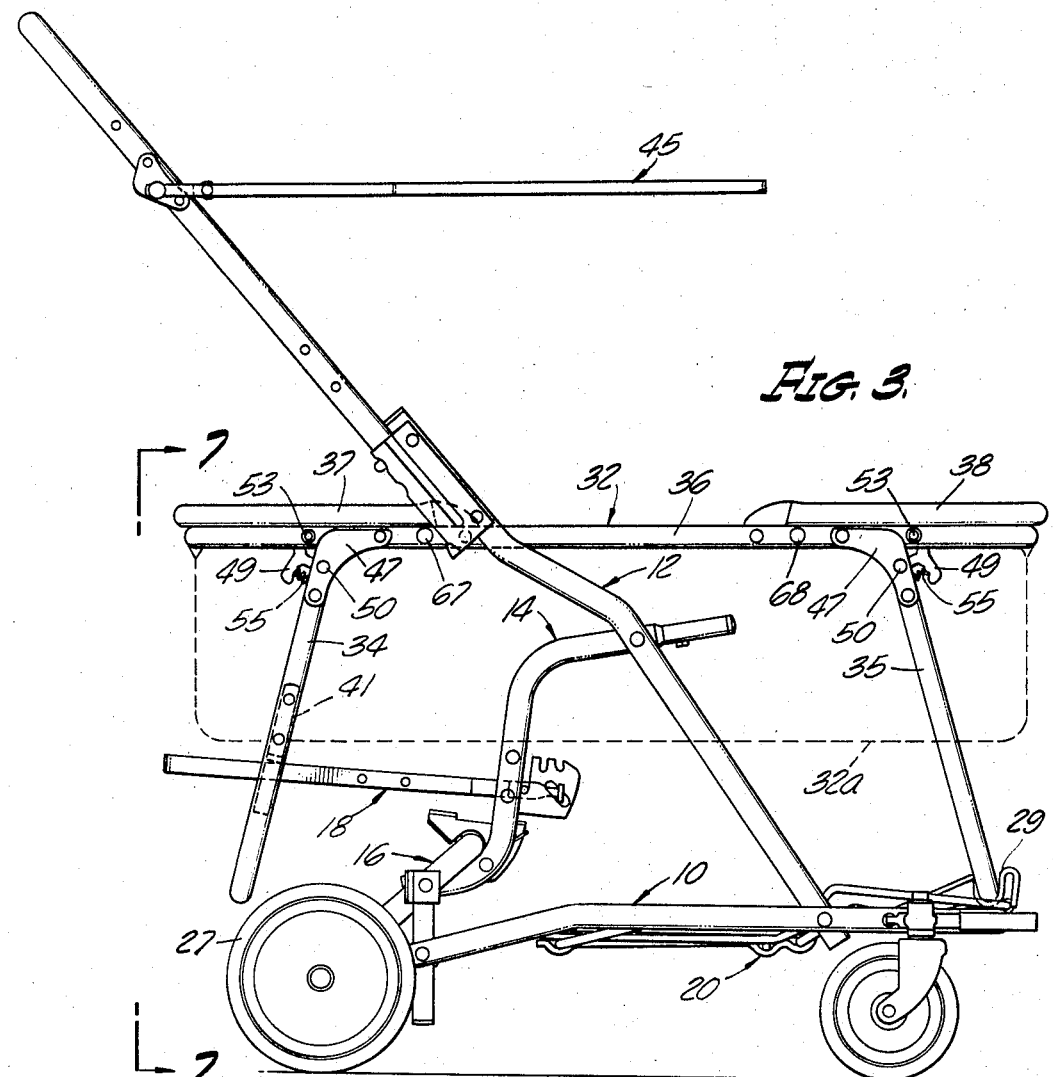
FIG. 3.
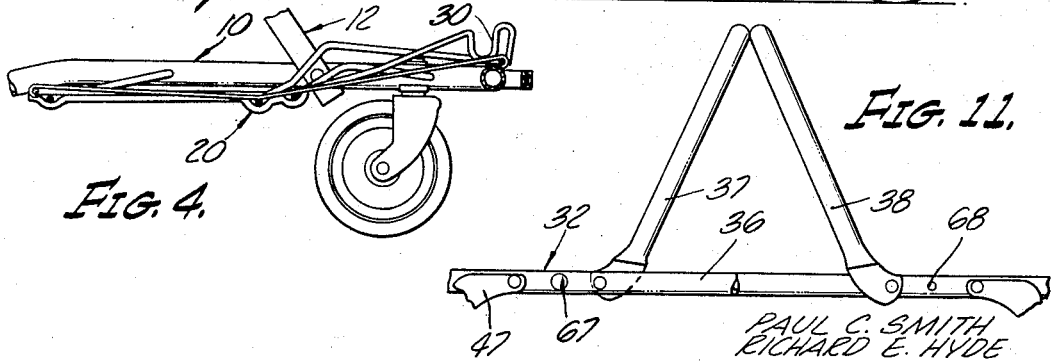
FIG. 4.
FIG. 11.
PAUL C. SMITH
RICHARD E. HYDE
INVENTORS.
BY Lyon & Lyon
ATTORNEYS

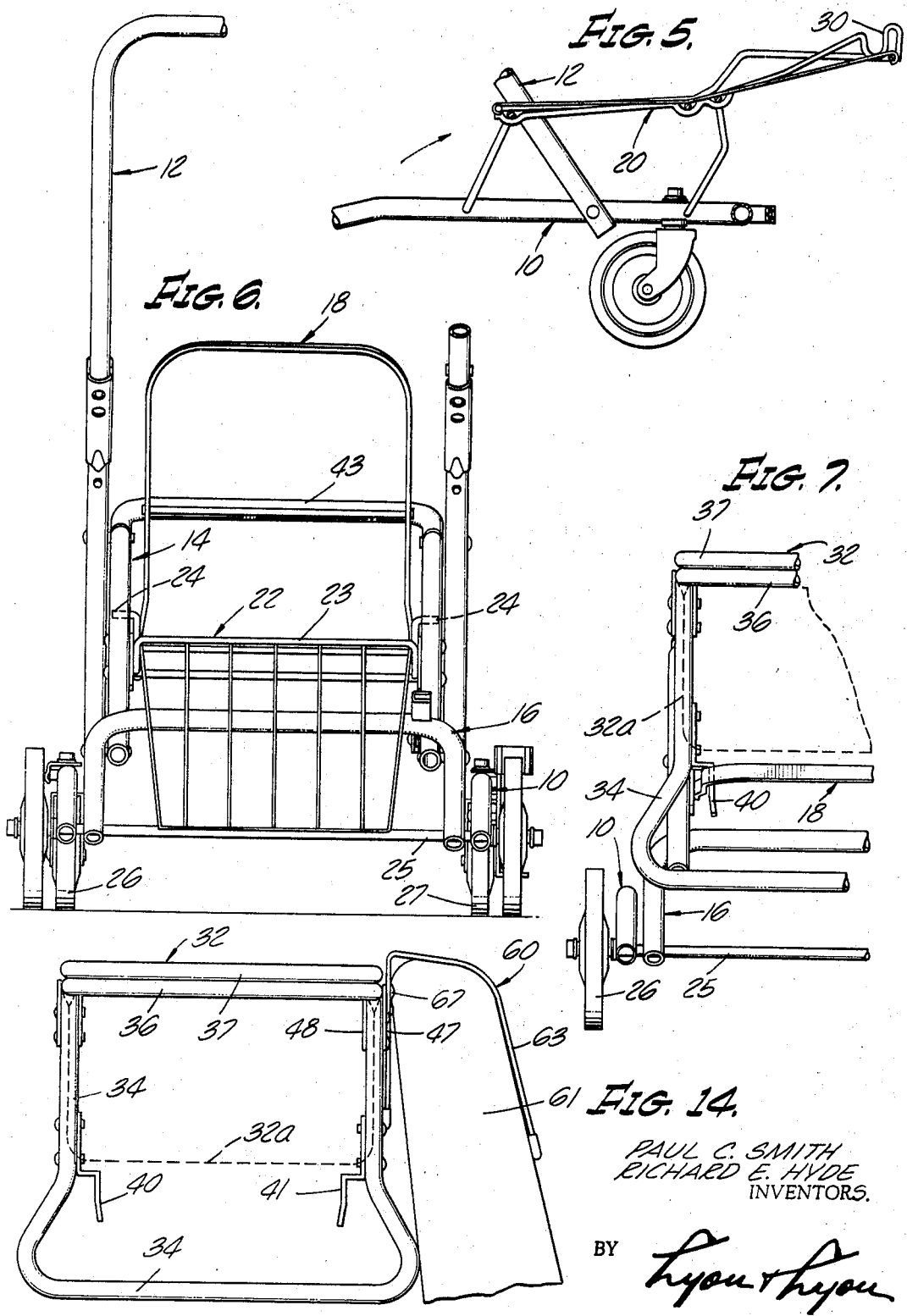

Aug. 8, 1967   P. C. SMITH ET AL   3,334,909
CONVERTIBLE STROLLER APPARATUS
Filed Jan. 6, 1967   4 Sheets-Sheet 4
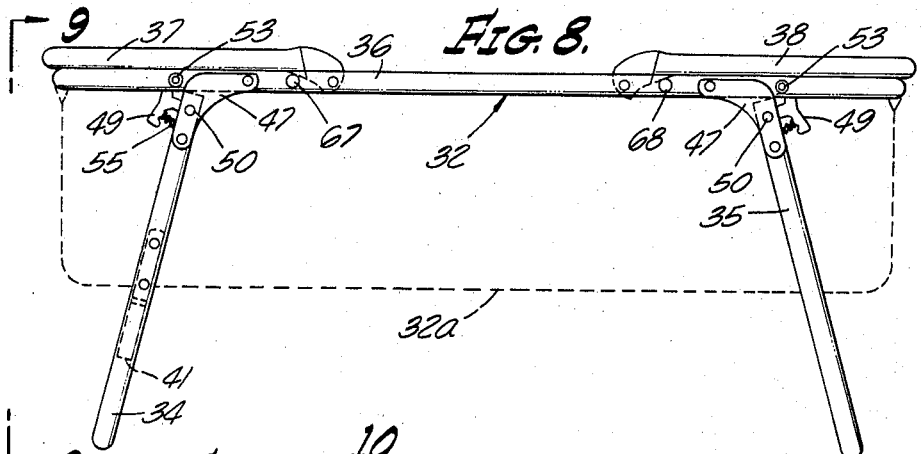
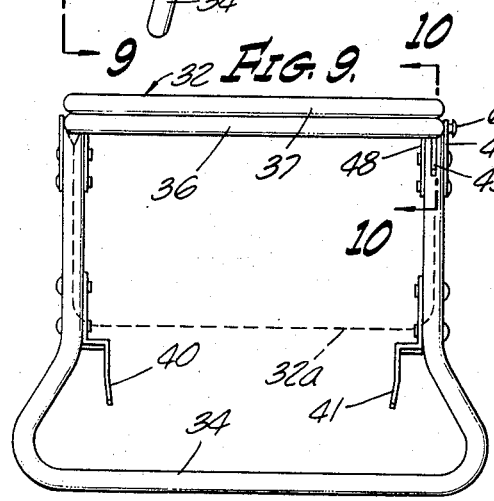
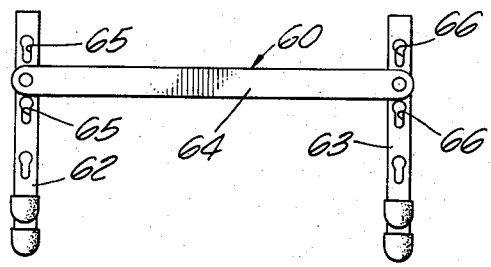
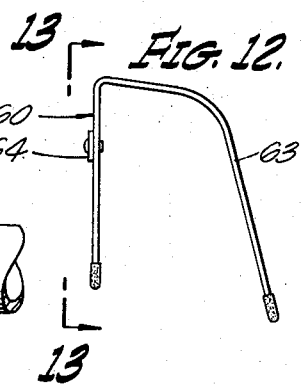
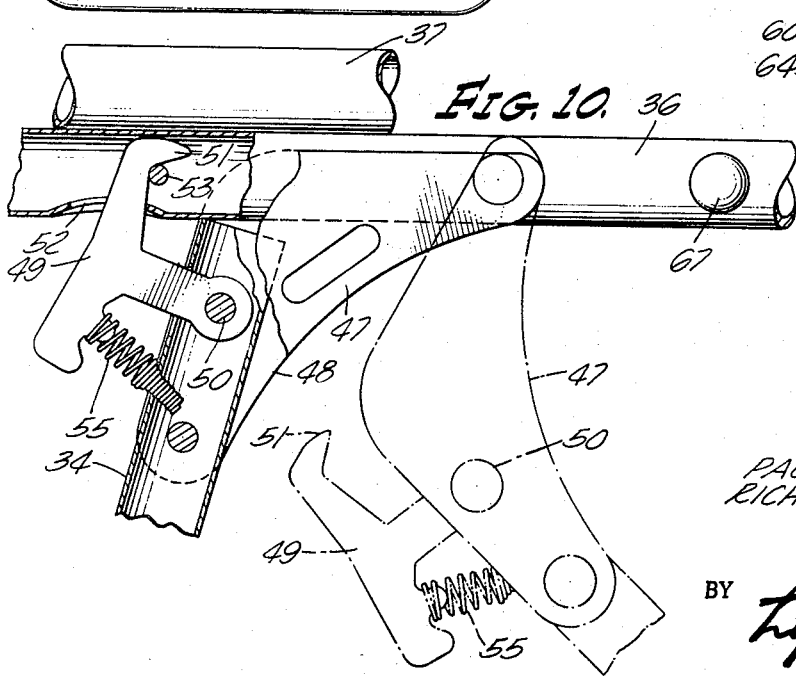
PAUL C. SMITH
RICHARD E. HYDE
INVENTORS.
BY Lyon Lyon
ATTORNEYS United States Patent Office 3,334,909
Patented Aug. 8, 1967

3,334,909
CONVERTIBLE STROLLER APPARATUS
Paul C. Smith, Pacific Palisades, and Richard E. Hyde, Palos Verdes Estates, Calif., assignors to Strolee of California, Inc., Los Angeles, Calif., a corporation of California
Filed Jan. 6, 1967, Ser. No. 607,775
5 Claims. (Cl. 280—31)

ABSTRACT OF THE DISCLOSURE

A stroller, such as a baby stroller, including a base frame, a handle frame pivotally connected to the base frame, an arm rest frame pivotally connected to the handle frame, a pivotal back rest frame and a foot rest. A basket can be coupled with the arm rest frame. The assembly is collapsible. A cross-member of the arm rest frame is removable and a bed frame can be mounted on the back rest frame and foot rest of the stroller. The bed frame also is collapsible, has carrying handles therewith, and may be attached by brackets to an automobile seat.

---

This invention relates to baby strollers and more particularly to a stroller and a bed device which may be used alone or in combination with the stroller.

It is a principal object of this invention to provide an improved stroller and bed device which may be mounted on the stroller and transported thereby.

It is an additional object of this invention to provide an improved collapsible bed device which may be used alone, readily attached to the seat of an automobile, or attached to and carried by a stroller.

Still another object of this invention is to provide a stroller which may be selectively arranged to accommodate and carry a bed device.

These and other objects and features of this invention will be better understood upon a consideration of the following description taken in conjunction with the drawings in which:

FIGURE 3 is a view similar to FIGURE 1 but further illustrates a frame of a bed device mounted on the stroller;

FIGURE 4 is a fragmentary view illustrating a portion of a foot rest of the stroller in a lowered position;

FIGURE 5 is a view similar to FIGURE 4 and illustrates the foot rest in a raised position;

FIGURE 6 is a rear view of the stroller taken along a line 6—6 of FIGURE 1;

FIGURE 7 is a fragmentary rear view taken along a line 7—7 of FIGURE 3;

FIGURE 8 is a side elevation of the frame removed from the stroller;

FIGURE 9 is an end view of the frame taken along a line 9—9 of FIGURE 8;

FIGURE 10 is a fragmentary view of the frame taken along a line 10—10 of FIGURE 9 and illustrating a latching mechanism thereof;

FIGURE 11 is a fragmentary view of the frame illustrating the manner in which the handles thereof may be extended;

FIGURE 12 is a view of a bracket which may be used with the frame for attaching it to an automobile seat;

FIGURE 13 is a view taken along a line 13—13 of FIGURE 12; and

FIGURE 14 is an end view of the frame illustrating the manner in which it may be coupled with an automobile seat.

Figure 1:
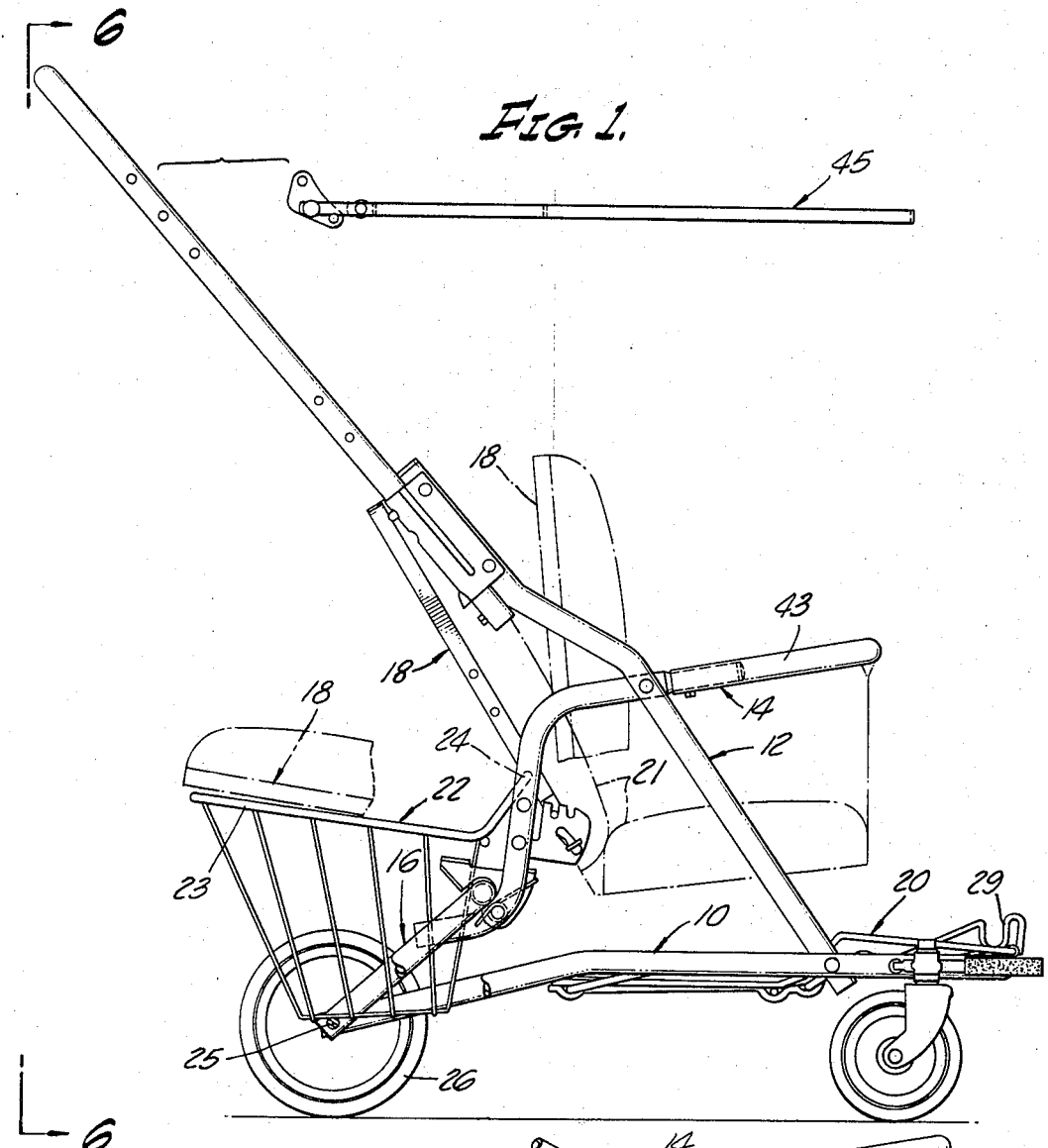
FIGURE 1 is a side elevation of a stroller according to the invention adapted to be selectively arranged to function as a stroller or to carry a bed device and function in a manner similar to a baby carriage.

A basic stroller of the general nature shown in several of the figures is described in U.S. Letters Patent No. 2,728,580 and includes a base frame 10, a handle frame 12 pivotally connected to the base frame, an arm rest frame 14 pivotally connected to the handle frame, and an inverted U-shaped toggle bar 16. Additionally, United States Letters Patent No. 2,798,730 describes the construction and operation of a pivotable back rest frame 18 and foot rest 20. A conventional seat structure is illustrated by dashed lines 21.

A wire basket 22 is provided and includes an upper structural member 23 having outwardly extending end 24 (note FIGURE 6) which couple the basket with the arm rest frame 14. The bottom of the basket 22 rests on an axle 25 which carries rear wheels 26 and 27. The forward end of the foot rest 20 includes a pair of U-shaped receptacles 29 and 30 (note FIGURES 1 and 4) which, along with the back rest frame 18, serve to support a bed frame 32 in the manner illustrated in FIGURES 3 and 7 and which will be described in greater detail subsequently.

Figure 2:
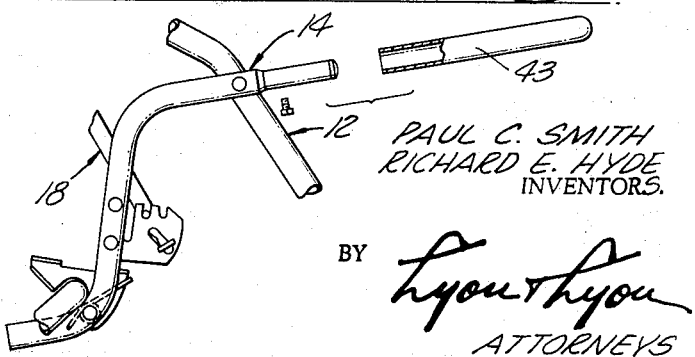
FIGURE 2 is a fragmentary view of a portion of the stroller shown in FIGURE 1 illustrating the manner in which the arm rest frame thereof is detachable.

The bed frame 32 includes retractable leg members 34 and 35, and a central rectangular supporting frame member 36 to which may be attached a fabric bed structure well known to those skilled in the art and generally illustrated by dashed lines 32a. The frame 32 further includes pivotally mounted handles 37 and 38 which may be extended as shown in FIGURE 11 to facilitate carrying the same. The leg members 34 and 35 may be of tubular construction and substantially U-shaped, and the leg member 34 may include a pair of brackets 40 and 41 as shown in FIGURE 9 which engage the lower back rest frame 18. The base of the leg member 35 is nestled in the receptacles 29 and 30 at the forward end of the foot rest 20. The forward cross member 43 of the arm rest frame 14 is removably coupled by suitable bolts as shown in FIGURE 2, and the back rest frame 18 is pivoted forwardly and downwardly as shown in FIGURE 3 to allow the frame 32 to be accommodated on the stroller. In this manner, the frame 32 and bed structure may be simply and quickly mounted on the stroller thereby converting it into a carriage type device. The normal seat structure coupled with the arm rest frame 14 and back rest 18 can be easily removed since it is typically only slid onto the back rest and snapped about the arm rest frame. A conventional canopy 45 which is pivotally attached to the handle frame 12 may be provided if desired.

A latching mechanism illustrated in FIGURE 10 is coupled between each of the leg members 34 and 35 and the supporting frame member 36. The upper extremities of the leg members 34 and 35 are each hinged to the frame member 36 by pairs of triangular plates, such as plates 47 and 48, affixed to respective leg members and pivoted to the frame member 36 as shown in FIGURE 10. A latch 49 is pivotally coupled at 50 to the leg member 34 and includes a finger 51 which extends through an opening 52 and engages a pin 53 within the frame member 36. A spring 55 coupled between the latch 49 and the member 34 retains the finger 51 in engagement with the pin 53. A similar latching mechanism is provided for the leg member 35, and these mechanisms enable the leg members 34 and 35 to be either folded substantially flush with the frame member 36 or securely latched in an extended position as shown in FIGURES 3 and 8.

A bracket 60 may be provided for attaching the bed frame 32 to an automobile seat 61 as shown in FIGURE 14. The bracket 60 includes two inverted U-shaped clamps 62 and 63 coupled together by a bar 64. A plurality of apertures 65 and 66 are provided in the respective clamps 62 and 63 for engaging headed pins 67 and 68 affixed to the supporting member 36 of the frame 32.

The present embodiment of this invention is to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A baby stroller of the type having an arm rest frame to which a back rest frame is pivotally mounted, a base frame coupled with the arm rest frame and a handle frame, and a foot rest coupled with said base frame, the improvement comprising
    said arm rest frame includes a forward end for supporting a portion of a seat structure, said forward end being removably coupled to the remainder of said arm rest frame,
    said foot rest including a plurality of receptacles at the forward end thereof, said back rest frame and said receptacles serving to receive and support a removable bed frame when said forward end of said arm rest frame is detached.

2. A stroller as in claim 1 wherein
    said bed frame comprises a supporting member and hinged leg members depending therefrom, one of said leg members having a base for resting within said receptacles and the other of said leg members having bracket means for engaging said back rest frame.

3. A stroller as in claim 2 wherein
    each of said leg members of said bed frame has a latch coupled between the respective leg member and said supporting member for retaining said leg members in an extended position, and
    a pair of handle members pivotally coupled with said supporting member.

4. In a baby stroller of the type having an arm rest frame to which a back rest frame is pivotally mounted, a base frame coupled with the arm rest frame and a handle frame, and a foot rest coupled with said base frame, the improvement comprising
    said foot rest including receptacle means for receiving and supporting a leg member of a bed frame,
    said bed frame comprising a supporting member and hinged leg members depending therefrom, one of said leg members having a base for resting within said receptacle means of said foot rest, and the other of said leg members having bracket means for engaging said back rest frame to thereby support said bed frame on said stroller, and
    said arm rest frame including a removable portion for enabling said bed frame to be accommodated on said stroller.

5. A bed frame which may be used with and transported by a stroller comprising
    a substantially rectangular supporting member,
    a pair of substantially U-shaped leg members, the extremities of said leg members being hinged intermediate the ends of said supporting member by a pair of hinge plates,
    a latch pivotally coupled with each of said leg members and having a finger for engaging said supporting member to retain said leg members in an extended position with respect to said supporting member, the finger of each of said latches adapted to extend into an aperture in said supporting member and engage a pin mounted within said supporting member, and each of said latches including a spring normally biasing said finger into engagement with said pin, and
    a pair of brackets coupled with one of said leg members for enabling said bed frame to be readily coupled with and supported by a stroller.

References Cited

UNITED STATES PATENTS

| | | | |
|---|---|---|---|
| 2,851,086 | 9/1958 | Weiner | 297—39 |
| 2,943,334 | 7/1960 | Golding | 5—93 |
| 2,967,059 | 1/1961 | Goldberg | 280—31 |
| 3,079,162 | 2/1963 | Michels | 280—30 X |
| 3,184,249 | 5/1965 | Shone | 280—36 |
| 3,258,276 | 6/1966 | Murcott | 297—153 X |

KENNETH H. BETTS, *Primary Examiner.*